US007747986B2

(12) United States Patent
LaVigne et al.

(10) Patent No.: US 7,747,986 B2
(45) Date of Patent: Jun. 29, 2010

(54) GENERATING STATIC PERFORMANCE MODELING FACTORS IN A DEPLOYED SYSTEM

(75) Inventors: Glenn F LaVigne, Carnation, WA (US); Efstathios Papaefstathiou, Redmond, WA (US); Jonathan C Hardwick, Kirkland, WA (US); Quanzhan Zheng, Sammamish, WA (US); Rebecca Isaacs, Cambridge (GB); Paul Barham, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 1140 days.

(21) Appl. No.: 11/154,090

(22) Filed: Jun. 15, 2005

(65) Prior Publication Data

US 2006/0288149 A1   Dec. 21, 2006

(51) Int. Cl.
  *G06F 9/44* (2006.01)
  *G06F 9/45* (2006.01)
(52) U.S. Cl. .................... 717/128; 717/131; 717/152
(58) Field of Classification Search ........................ None
  See application file for complete search history.

(56) References Cited

U.S. PATENT DOCUMENTS 5,889,993 A * 3/1999 Kroeger et al. ............. 717/128

6,807,583 B2 * 10/2004 Hrischuk et al. ............ 719/318

OTHER PUBLICATIONS

HyPerformix Performance Management and Capacity Planning Solutions for the Enterprise, © 2005 HyPerformix, Inc., <http://www.hyperformix.com> [retrieved Nov. 7, 2005].
OPNET Solutions for Network R&D, *OPNET Technologies, Inc.*, , n.d., <http://www.opnet.com/products/networkr&d> [retrieved Nov. 7, 2005].

* cited by examiner

*Primary Examiner*—Chuck O Kendall
(74) *Attorney, Agent, or Firm*—Workman Nydegger

(57) ABSTRACT

A computing system for determining performance factors for using in performance modeling of a deployed subject system, is presented. The computing system includes a plurality of software components comprising the subject system. Each of the components is susceptible to event tracing while executing on the computing system. The computing system includes a tracing component. The tracing component is configured to trace events of the components of the subject system as they execute. The computing system includes a transaction identification table. The transaction identification table comprises starting and ending actions for transactions performed by the subject system. The computing system also includes a transaction identification component that identifies actions from traced events, identifies related actions corresponding to a transaction according to the starting and ending actions in the transaction identification table, and stores the related actions in the transaction workflow data store.

19 Claims, 8 Drawing Sheets

| Transaction Identifier | Start Action | End Action |
|---|---|---|
| Web Page Request | HttpRequest, Start | IISGeneral, General_Request_End |
| Web Post Data | HttpPost | IISGeneral, General_Request_End |
| Web SQL Request | HttpRequest, SQL | IISGeneral, General_Request_End |
| ... | | |

GENERATING STATIC PERFORMANCE MODELING FACTORS IN A DEPLOYED SYSTEM

BACKGROUND

As more and more businesses and organizations move toward networked-based services, performance modeling will become increasingly more important. Performance modeling refers to creating a computer model that emulates the performance of a computer system.

As those skilled in the art will appreciate, performance modeling can be used to predict and analyze the effect of various factors on the modeled system, these factors including changes to the input load, or to the configuration of hardware and/or software. Indeed, performance modeling has many benefits including performance debugging (identifying which, if any, system components are performing at unacceptable levels, and why they are underperforming), capacity planning (applying projected loads to the model to analyze what hardware or configurations would be needed to support the projected load), prospective analysis (the ability to test "what if" scenarios with respect to the system, its configuration, and its workload), and system "health" monitoring (determining whether the computer system is operating according to expected behaviors and levels).

While performance modeling provides tremendous benefits, currently, good performance modeling is difficult to obtain. More particularly, it is very difficult to accurately and adequately create a performance model for a typical system in all its complexity. As such, generating performance models have largely been the purview of consultants and others with specialized expertise in this arena. Even more, performance modeling is currently the product of laboratory, controlled environment analysis. As such, even the best performance models only approximate what actually occurs in the "live", deployed and operating system.

There are several performance factors that are used to generate a performance model of a particular system, hereafter referred to as the subject system. FIG. 1 is a block diagram illustrating exemplary performance factors used to create a performance model of a subject system. These performance factors include: the physical topology 102 of the subject system, i.e., the hardware operating/supporting the subject system, including multiple computers, CPUs, network interface cards, disk drives, RAM, and the like; the logical topology 104 of the subject system mapping how the various discrete software components of the subject system are distributed on the physical topology 102; the system workload 106 of the subject system identifying the transactions to be performed on the subject system, as well as an estimation as to the frequency of these transactions; the transaction workflow 108 identifying the discrete actions carried out by each transaction; and the action costs 110 that identify costs associated with performing each discrete action, such as CPU time, communication bandwidth, disk storage space, memory usage, and the like.

Once established, these performance factors 102-110 are combined to generate a performance model 112 of the subject system. Using this performance model, a user can then create performance predictions 116 regarding the subject system. Even further, based on the performance predictions of the subject system, additional uses and analyses may be generated, including bottleneck analyses 118, system health reports 120, "what if" scenarios 122, capacity planning 124, and the like.

With regard to the performance factors, the physical topology 102, the logical topology 104, and the system workload 106 are generally viewed as dynamic factors, i.e., they are readily subject to modification such as by adding additional computers, memory, reducing the number of transactions performed, etc. However, the transaction workflow 108 and the action costs 110 are considered to be static factors 114 as this information does not readily change. In other words, while the speed of the CPU may increase, or communication bandwidth is improved, the discrete actions carried out by a single user transaction remain the same.

There are automated tools that can be used to determine the physical topology 102, logical topology 104, as well as estimate a system workload 106, even in a deployed system. However, in order to determine the static performance factors 114, particularly transaction workflow 108 and action costs 110, a consultant or expert with intimate knowledge of the various subject system components is needed, and uses a controlled, laboratory like environment, not a deployed system. Under these control conditions, and by repeated tests and analysis, using the expert knowledge of the consultant with regard to the components tested, the transaction workflow 108 and action costs 110 are derived. Of course, while this is very expensive and time consuming, those skilled in the art will also readily appreciate that many "things" occur within a deployed system that do not arise in a controlled, laboratory-like environment. Thus, even after expending substantial effort and resources to create a performance model of subject system, at best, current performance models are only an approximation of the deployed subject system.

SUMMARY OF THE INVENTION

According to aspects of the present invention, a computing system for determining performance factors for using in performance modeling of a deployed subject system, is presented. The computing system includes a plurality of software components comprising the subject system. Each of the components is susceptible to event tracing while executing on the computing system. The computing system includes a tracing component. The tracing component is configured to trace events of the components of the subject system as they execute. The computing system includes a transaction identification table. The transaction identification table comprises starting and ending actions for transactions performed by the subject system. The computing system also includes a transaction identification component that identifies actions from the traced events, identifies related actions corresponding to a transaction according to the starting and ending actions in the transaction identification table, and stores the related actions in the transaction workflow data store.

According to additional aspects of the present invention, a computer-readable medium bearing computer-executable instructions is presented. When executed on a computer system, the computer-executable instructions carry out a method for determining performance factors used in generating a performance model of a subject system deployed on the computer system. The method comprises tracing events of components executing on the computer system, including components of the subject system. Actions from the traced events are then identified. Related actions corresponding to a transaction are identified. The related actions corresponding to the transaction are then stored in a transaction workflow data store.

According to still further aspects of the present invention, a method for determining performance factors used in generating a performance model of a subject system deployed on a computer system, is presented. The method comprises obtaining one or more events traced from components executing on the computer system, including components of the subject system log. Actions from the traced events are then identified. Related actions corresponding to a transaction are identified. Costs of the related actions corresponding to the transaction are then determined from information in the event log. The related actions and their determined costs are stored in an action costs data store.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5 is a block diagram illustrating an exemplary transaction identification table;

DETAILED DESCRIPTION

Figure 1:
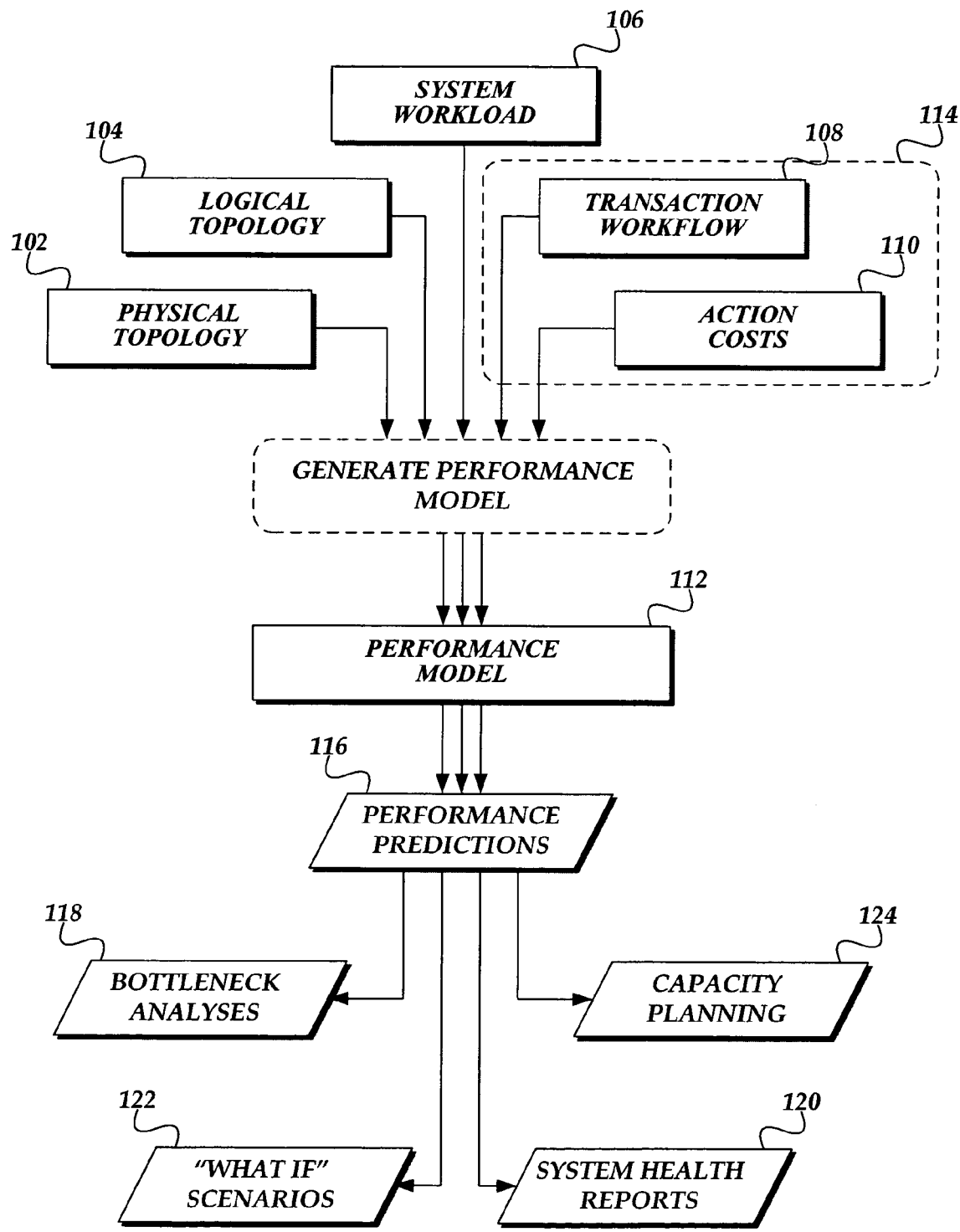
FIG. 1 is a block diagram illustrating exemplary performance factors used to create a performance model of a subject system.
Figure 2:
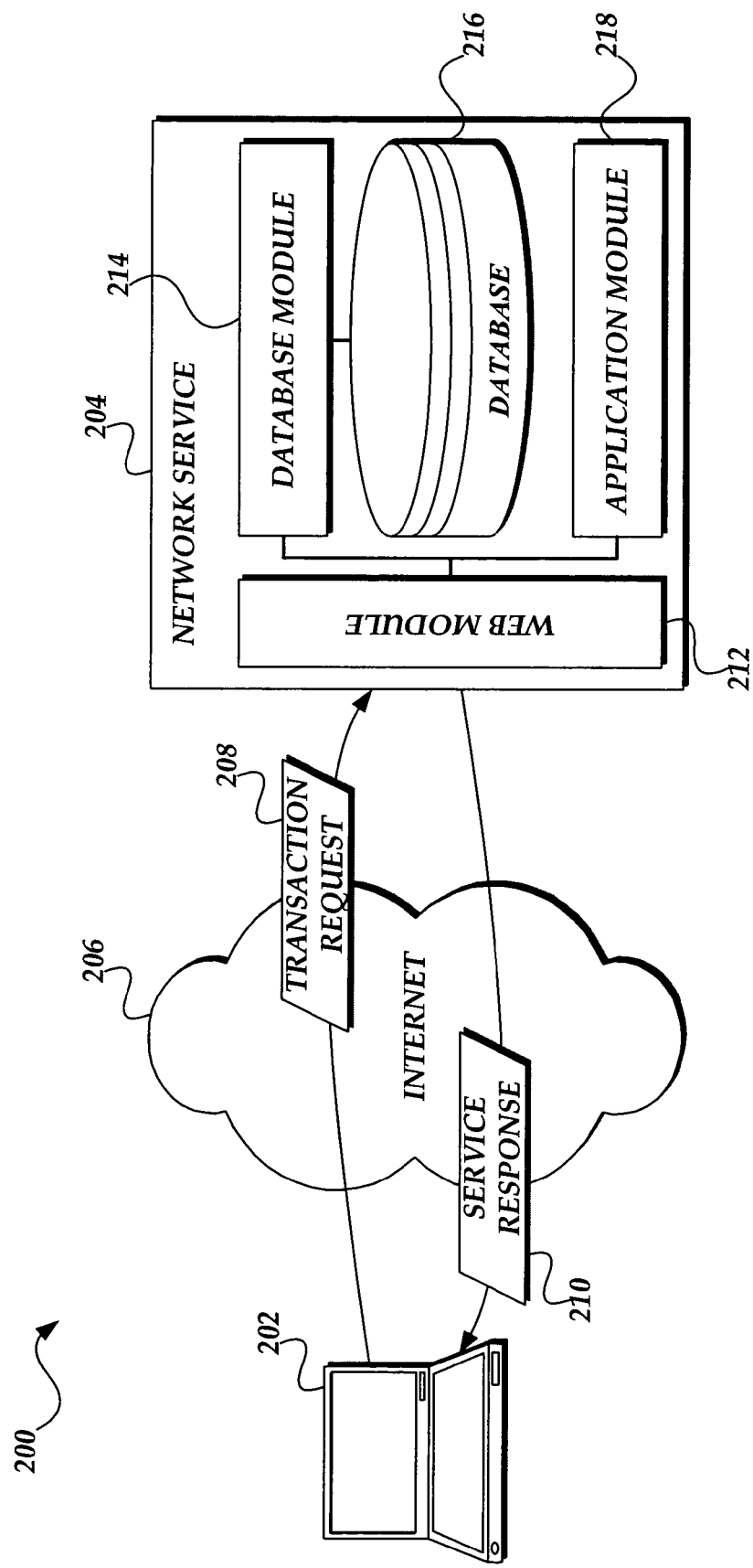
FIG. 2 is a pictorial diagram illustrating an exemplary operating environment suitable for implementing aspects of the present invention.

According to aspects of the present invention, static performance factors 114 can now be derived in a "live", deployed subject system. FIG. 2 is a pictorial diagram illustrating an exemplary operating environment 200 suitable for implementing aspects of the present invention, i.e., deriving static performance factors 114 in a "live", deployed subject system. In particular, FIG. 2 illustrates an exemplary single-machine network service 204 (the network service 204 being the subject system to be modeled) communicating with a client computer 202 over the Internet 206, where the network service/subject system provides a to-be-modeled service to the client computer.

As those skilled in the art will appreciate, typical of this type of system, the client computer 202 submits transaction requests, such as transaction request 208 to the network service 204. In turn, the network service 204 processes the received transaction request 208, and in many cases returns a service response 210 to the client computer 202. For example, assuming that the network service 204 is an e-commerce system, the request/response transaction between the client computer 202 and network service 204 could be a request to view a product catalog hosted by the e-commerce system, with the service response 210 being one or more browser-viewable Web pages.

The network service 204 will typically be comprised of a variety of components which, operating collectively, provide the "network service" to the client computer 202. As shown in FIG. 2, the network service 204 includes a plurality of software components including the web module 212, a database module 214 and corresponding database 216, and an application module 218. Of course, the identified components are exemplary only, included for illustration purposes only, and should not be construed as limiting upon the present invention. A given network service may include any number and/or combination of cooperative and/or integrated components, many of which are not identified in the exemplary network service 204.

According to the present invention, in order to derive/determine the static performance factors 114 in a deployed subject system, such as network service 204, the components of the subject system must be susceptible to event tracing. As those skilled in the art will recognize, event tracing refers to issuing notices that various event (such as, but not limited to, thread execution, disk accesses, inter-computer communications, system interrupts, inter-process calls, and the like) as they occur on a computer system. In some cases, the events (per the notices) are recorded in an event log on the computer system.

According to aspects of the present invention, the events are examined, and based on these events, the system determines the various actions carried out by the subject system components. In addition to determining the actions based on the events, the resource costs of the determined actions, measured in units appropriate to the particular action, are also determined. For example, an action occurring on the CPU may be associated with a resource cost of CPU cycles, while an action taking place on the network interface card might be measured in terms of network bandwidth. Hereafter, these resource costs will be generally called action costs.

In one embodiment, the components of the subject system may be susceptible to event tracing by virtue of being instrumented for tracing, or in other words, special codes or a series of codes are inserted in the components of the subject system that enable and facilitate event tracing on the subject system. The inserted codes may perform the tracing themselves, or alternatively, act as a signal to another component to issue a notice of the event. Alternatively, event tracing may be enabled on the computer system due to the abilities of the operating system operating on the computer, including an operating system component specifically designed for event tracing. For example, Microsoft Corporation provides event tracing (called Event Tracing for Windows, or ETW) on several of its Windows operating systems. Similarly, other operating system providers also provide event tracing capabilities. As yet another alternative, an event tracing module installed on a computer system to listen for and detect the events on the computer system may be used in event tracing. Accordingly, while the components of the subject system should be susceptible to event tracing, the present invention should not be construed as limited to any particular event tracing mechanism.

It should be appreciated that while FIG. 2 illustrates that the client computer 202 communicates with the network service 204 via the Internet 206, it is for illustration purposes only, and should not be construed as limiting upon the present invention. Indeed, the client computer 202 could communicate with the network service 204 over any communication network, such as a wide-area network, a local-area network, and the like. Similarly, while FIG. 2 illustrates that the client computer 202 and network service 204 are different computer systems, this is also for illustration purposes, and should not be construed as limiting upon the present invention. In fact, according to aspects of the present invention, a network is not needed at all. The present invention may be applied to determining the static performance modeling factors for all or any part of a single computer system, without the use of an external client computer or a network.

Figure 3:
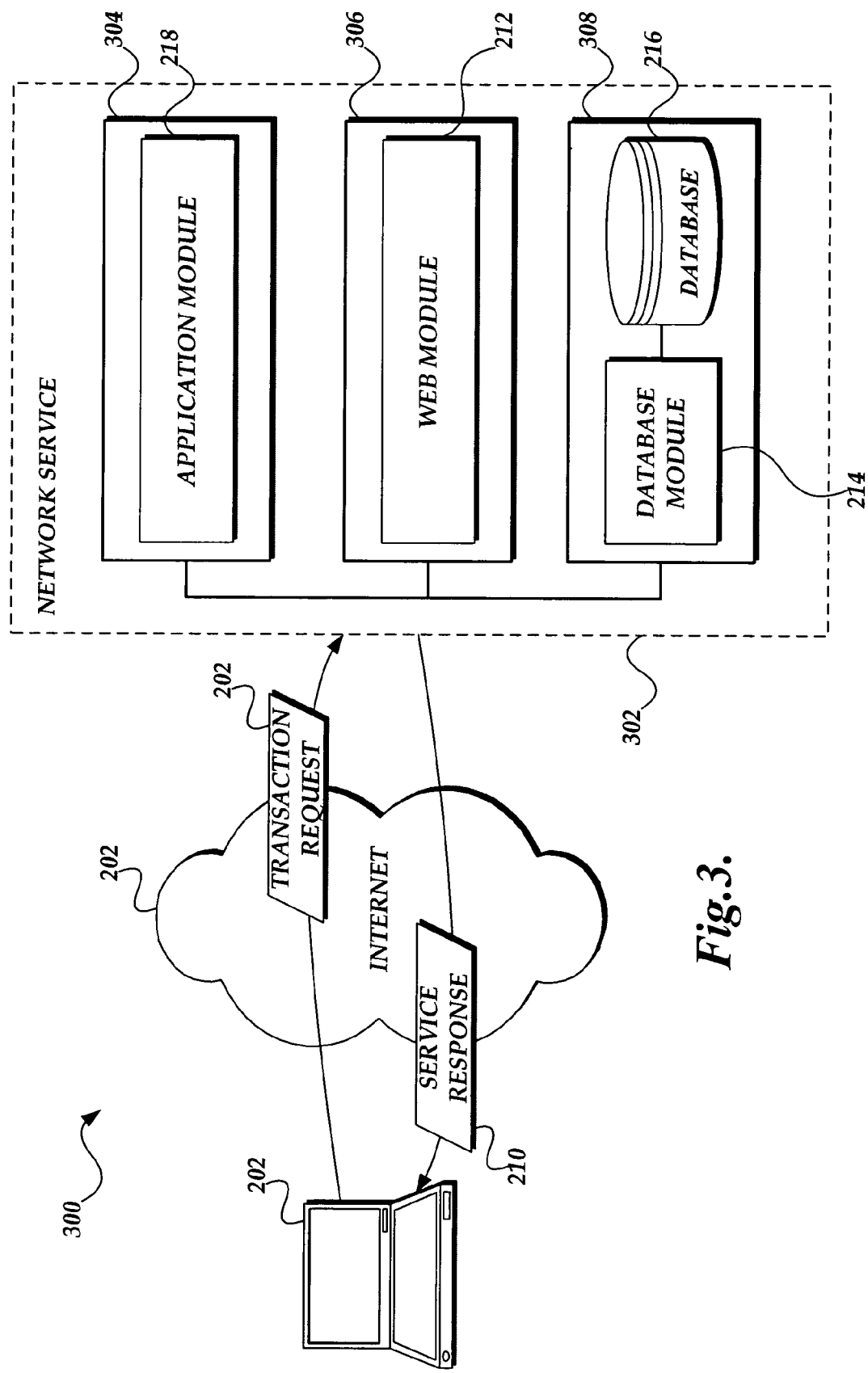
FIG. 3 is a pictorial diagram illustrating an alternative exemplary computing system environment for implementing aspects of the present invention.

While the present invention may be beneficially applied to determining static performance factors 114 of a single computer subject system, the present invention is not so limited. Indeed, the present invention may also be beneficially applied to a multi-computer subject system. FIG. 3 is a pictorial diagram illustrating an alternative exemplary computing system environment 300 for implementing aspects of the present invention. More particularly, the subject system, network service 304, includes a plurality of separate but cooperative computing systems, comprising computing systems 306-310.

As can be seen in FIGS. 2 and 3, the network service 304 includes all of the components as those found in the subject system, i.e., network service 204, but distributed among computer systems 306-310. Furthermore, while the present invention is not limited to determining static performance modeling factors 114 for a subject system on a single computer, the different computer systems supporting the subject system are not required to be of a similar type. For example, while computer system 306 and 308 may be Windows computers (i.e., computer systems running a Microsoft Corporation Windows operating system), computer system 310 may be a Solaris computer (i.e., a computer system running Sun System's Solaris operating system).

While the computer systems supporting the subject system need not be of the same type, the components on each system should be susceptible to event tracing, as described above.

In regard to the following discussion, while the present invention is suitable for use on a variety of computer system configurations, such as the systems illustrated in FIGS. 2 and 3, the following discussion regarding a subject system will be presented in terms of that subject system operating on a single computer.

Figure 4:
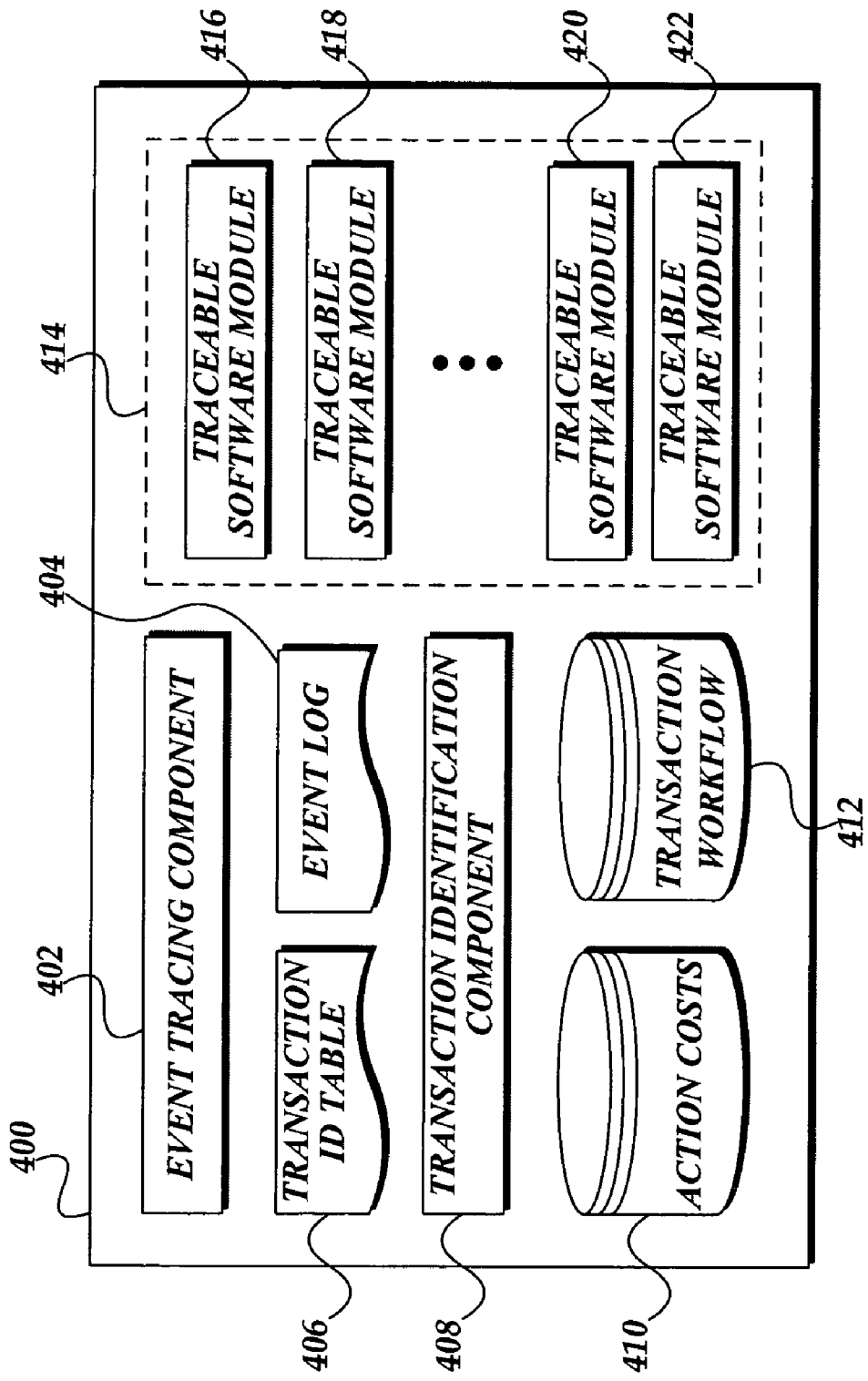
FIG. 4 is a block diagram illustrating an exemplary computing environment for determining static performance modeling factors of a deployed subject system.

FIG. 4 is a block diagram illustrating an exemplary computing environment 400 for determining static performance modeling factors 114 of a deployed subject system 414. The exemplary computing environment 400 includes an event tracing component 402 which records the actions and events occurring on the computing environment 400, including the actions taken by the components of the subject system 414, into an event log 404.

The exemplary computing environment 400 also includes a transaction identification component 408 that identifies the various transactions of the subject system 414 from the action log 404 according to a transaction identification table 406, and that further identifies the discrete actions of the identified transactions. The transaction identification module 408 records the identified transactions, along with the actions that comprised the identified transactions, in the transaction workflow data store 412. The transaction identification module 408 also determines the resource costs associated with each action from the information in the event log 404, and stores those costs action pairs in the action costs data store 414.

Also shown in the exemplary computing environment 400, the subject system 414 comprises a plurality of traceable software modules 416-422. As indicated above, each software module of the subject system 414 must be susceptible to event tracing. Of course, as those skilled in the art will appreciate, in a deployed system, other software modules that are not part of the subject system 414 will also likely be concurrently operating, and depending on the event tracing mechanism used, may also be traced such that their actions are recorded by the event tracing component 402 in the event log 404. Thus, the transaction identification component 408 also acts as a filter, selecting only those actions performed by the traceable software modules 416-422 of the subject system 414 when identifying the transactions for the transaction workflow data store 412, and the actions and costs pairs recorded in the action costs data store 410.

It should be appreciated that the description of the above components, the event tracing component 402 and the transaction identification component 408 are set forth as single components in the exemplary computing environment 400, it is a logical distinction, and should not be viewed as limiting upon the present invention. In an alternative embodiment, the above described components may actually be implemented by numerous subcomponents, such as a subcomponent to filter actions corresponding to the subject system from the event log 404, another subcomponent to identify transactions in the event log, yet another to identify the actions comprising the identified transactions, and so forth. It should be further noted that the components of the exemplary computing environment 400, while illustrated as entirely located on a single computer, may be distributed among a plurality of computers in any number of configurations.

It should further be appreciated that while FIG. 4 illustrates that events are recorded into an event log 404, in alternative embodiments, events are not recorded into an event log, but instead are streamed to components of the present invention. Accordingly, the inclusion of an event log 404 in the present and subsequent discussions should be viewed as illustrative of one alternative embodiment, and should not be construed as limiting upon the present invention.

In regard to the transaction identification table 406, this table includes predetermined identifiers/tokens that enable the transaction identification component 408 to identify the starting and ending actions of a given transaction in the event log 404. As will be described in greater detail below, after having located beginning and ending actions, and using the identified starting and ending actions, the transaction identification component 408 can also identify the actions that comprise the identified transaction, as well as their costs. For example, FIG. 5 is a block diagram illustrating an exemplary transaction identification table 500 illustrating starting and ending identifiers which the transaction identification component 408 uses to identify the start and end transactions of a sequence of actions comprising an identified transaction.

As shown in FIG. 5, the transaction identification table 500 includes three columns of information: one column for a transaction identifier, one column for listing the starting action for the transaction, and one column for the ending action of a transaction. It should be appreciated, however, that while the exemplary transaction identification table 500 suggests that each starting action has a single corresponding ending action, this is for illustration and simplicity purposes only, and should not be construed as limiting upon the present invention. In an actual embodiment, a single start action may have a plurality of corresponding ending actions. For example, an HttpRequest starting action may terminate with one of several ending actions depending on whether the web server module has the requested information in cache, or whether the information was regenerated.

While only three columns/fields of information are displayed in the exemplary transaction identification table 500, it should be appreciated that other fields of information may be included in the transaction identification table 500 to assist the transaction identification component 408 in identifying the transactions, and the corresponding actions of an identified transaction. Thus, it should be appreciated that the entries in the transaction identification table 500 are for illustration purposes only, and may or may not reflect actual starting and ending actions of a transaction.

As mentioned above, the event log 404 comprises actions and events recorded by the event tracing component 402 that occur on the host computer system. Actions carried out by the components of the subject system are recorded in the event log 404. As those skilled in the art will appreciate, each components of the subject system will appear to be operating independently in regard to the events and actions recorded in the event log 404. Thus, after identifying the starting action of a transaction, the transaction identification component 408 must also determine which actions correspond to the transaction.

Figure 6:
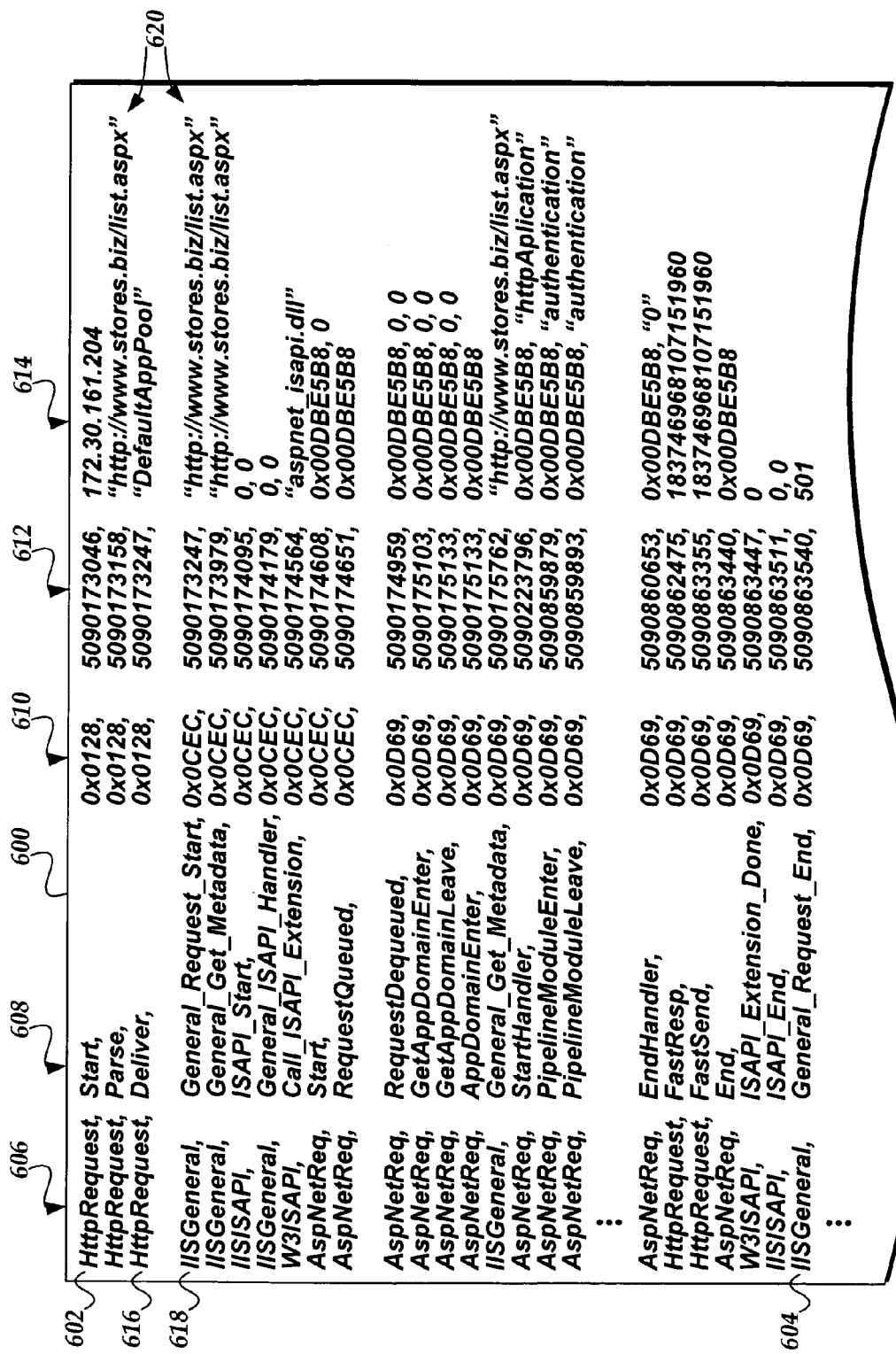
FIG. 6 is pictorial diagram illustrating portions of an exemplary event log showing actions related to a particular transaction, and for illustrating how a transaction identification component may determine which actions correspond to an identified transaction.

FIG. 6 is pictorial diagram illustrating portions of an exemplary event log 600 showing actions related to a particular transaction, and for illustrating how a transaction identification component 408 may determine which actions correspond to an identified transaction. As shown in FIG. 6, line 602 illustrates the starting action of the identified transaction that the transaction identification component 408 would have identified using the transaction identification table 406. Similarly, after filtering through the event log for actions related to the current transaction, the transaction identification component 408 would have identified the action on line 604 as the ending action.

In getting from the starting action on line 602 to the ending action on line 604, the transaction identification component 408 must trace through the event log identifying actions related to the transaction. While this would be easy if only one software component were being modeled, in most subject systems there is a plurality of traceable software components. Thus, the transaction identification component 408 must track related actions among a plurality of components.

Various techniques are employed to successfully track a transaction among a plurality of cooperative components. For example, the event log is typically formatted according to a predetermined schema. As shown in the exemplary event log 600, the event log has both fixed fields and dynamic fields. The fixed fields correspond to the first four columns in the event log 600 and include a general event classification 606, a sub-classification 608, a process thread identifier 610, and a timestamp 612. The dynamic fields, column 614, are variable depending on the event classification and sub-classification.

Clearly, one technique to trace through the event log to identify actions related to a transaction is according to the process thread identifiers. Thus, the first three events/actions in the event log 600 may be identified as being part of the same transaction. Of course, the process thread identifiers are not the same for other components in the subject system. Thus, the transaction identification component 408 may also look to other fields in the event log. For example, lines 616 and 618 are of different process threads. However, in this example, by examining data in the dynamic fields column 614, as indicated by arrows 620, the transaction identification component 408 can identify a relationship between threads, thus inferring that the component corresponding to the process thread identifier of line 616 is a continuation of the identified transaction.

Event tracing modules, such as those provided by operating systems such as Microsoft Corporation's ETW, typically only record events that occur on a single computer system. In other words, the event tracing component records events occurring on the machine upon which the event tracing component is installed. However, as indicated above, subject systems, such as environment 300 of FIG. 3, may be distributed over a plurality of computer systems.

In some computing systems, there may be the so-called end-to-end tracing (or E2E tracing). E2E tracing is typified by the use of a token which is passed from a first computer to a second computer with the execution of a transaction, where the token for the process/transaction remains the same as it moves from computer system to computer system. Based on the token, the transaction identification component 408 is easily able to trace the transaction across the various computer systems.

However, in many cases, E2E tracing is not available. Thus, while the components of a subject system are traced, it may be that each computer system generates it own event log. Accordingly, in order to identify the actions of a subject system distributed across multiple computers, a transaction identification module 408 may be required to obtain more than one event log and trace the actions of a transaction throughout the multiple event logs. Time stamps of actions/events may be used to trace the actions of a transaction throughout multiple event logs, as well as other techniques such as correlating resource costs and other information in the fixed and dynamic data fields, and the like.

It should be appreciated that the above examples of identifying the actions associated with a transaction are illustrative only, and should not be construed as limiting upon the present invention. Numerous techniques may be used to identify the actions associated with a particular transaction, all of which are contemplated as falling within the scope of the present invention.

As a by-product of identifying transactions and corresponding actions in a deployed subject system, the same components that determine the static performance factors 114 may also be able to record the frequency with which the transactions occur, which could then be used to update information in the system workload 106.

Figure 7A:
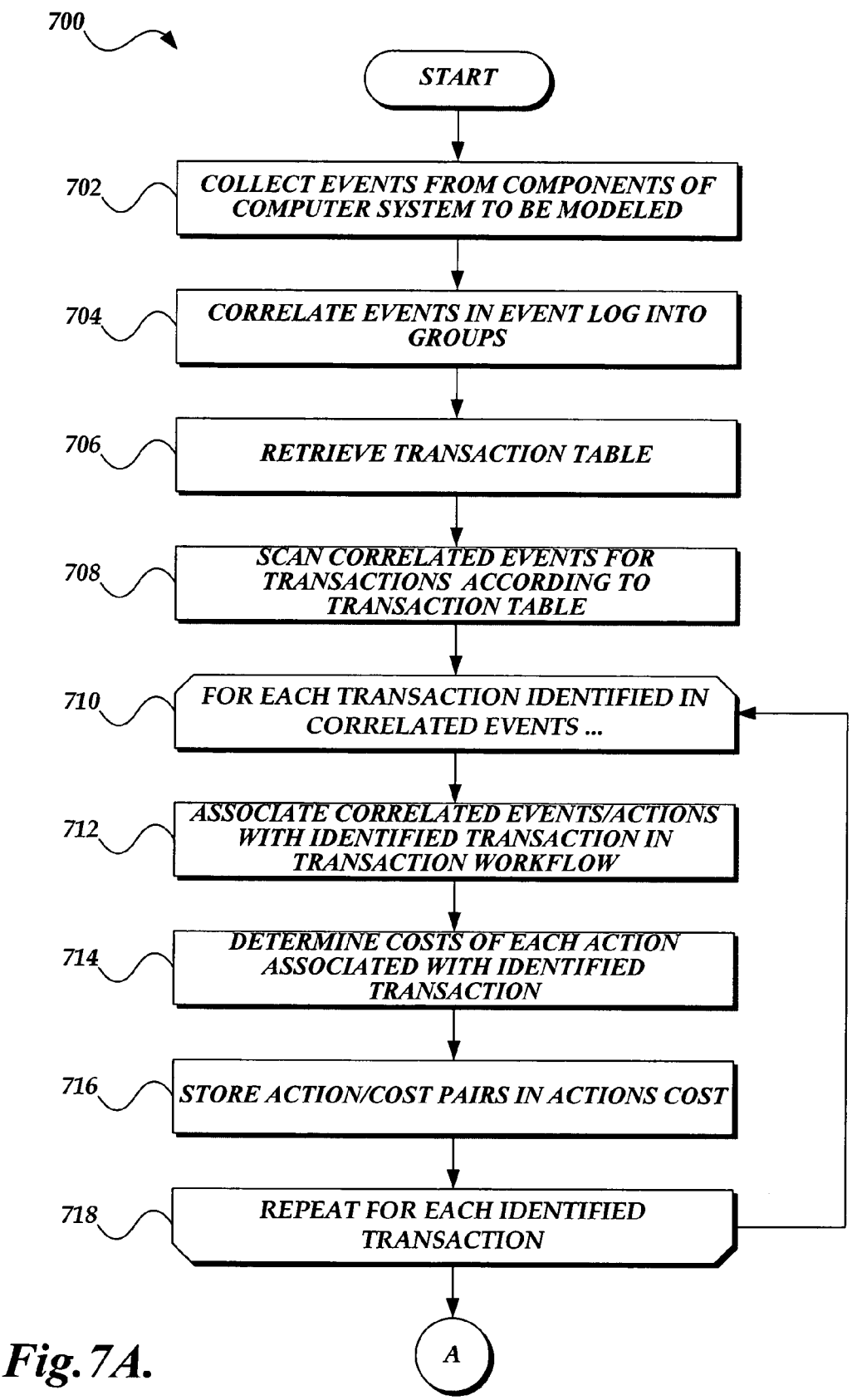
FIGS. 7A and 7B are a flow diagram illustrating an exemplary routine for determining static performance factors in a deployed subject system and generating a performance module of the subject system.
Figure 7B:
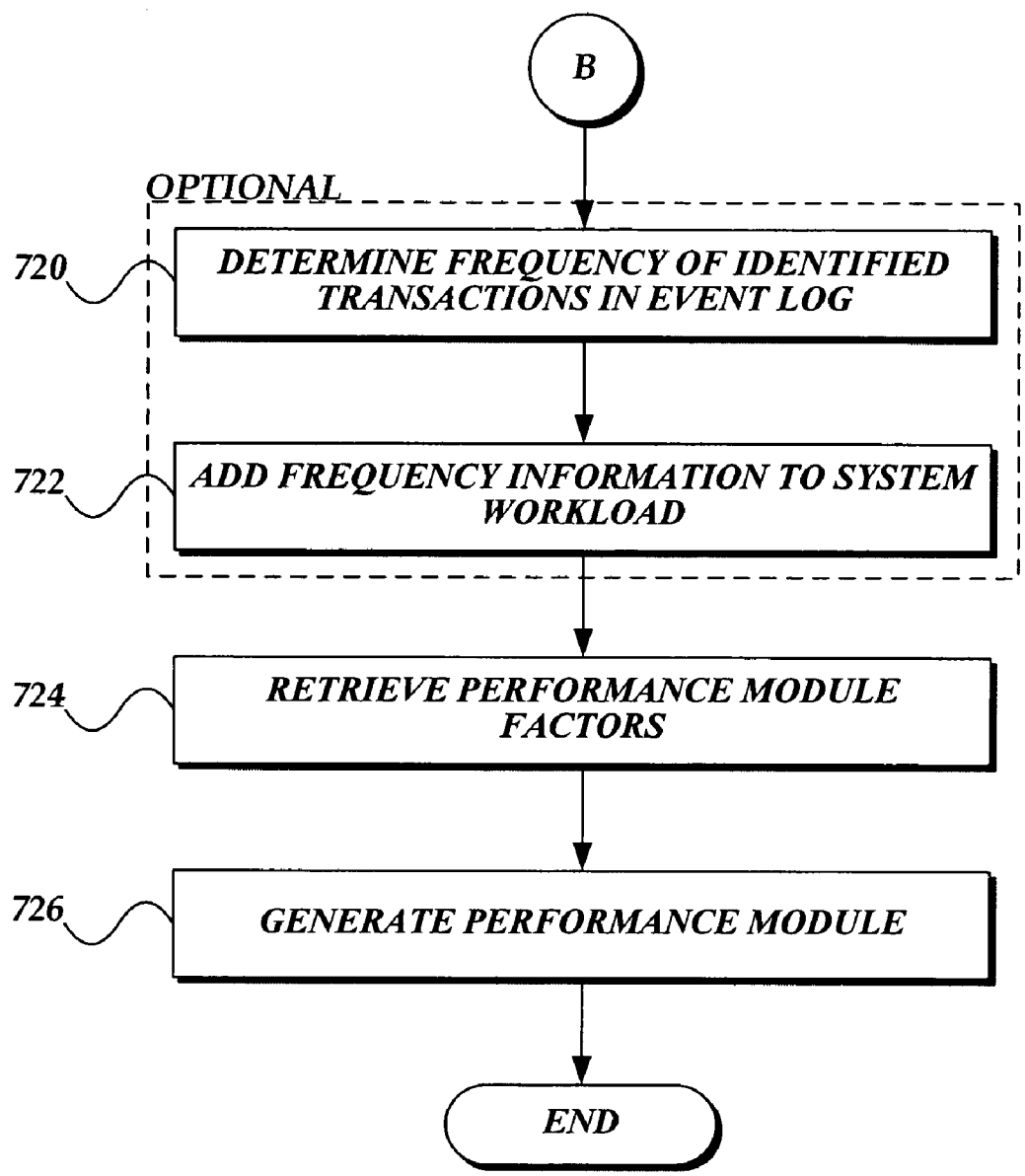

FIGS. 7A and 7B are a flow diagram illustrating an exemplary routine 700 for determining static performance factors 114 in a deployed subject system and generating a performance module of the subject system. Beginning at block 700, the components of the subject system are traced as they operate in a "live" manner. At some point after a number of events have been recorded in the event log 404, at block 702, the transaction identification component 408 identifies and correlates the events in the event log 404 into groups of related actions.

At block 706, the transaction identification component 408 retrieves the transaction identification table 406. At block 708 the transaction identification component 408 uses the transaction identification table 406 to identify the start and end of transactions in the groups of correlated events.

At control block 710, a "for" construct is begun that iterates the following steps up to the end control block 718 for each transaction identified in the events. At block 712, the related actions between the identified starting and ending actions of the transaction are stored in the transaction workflow data store 108 along with the identity of the transaction. At block 714, the costs of each action associated with the transaction is stored with the action's identifier in the action costs data store 110. Thereafter, at end control block 718, the routine 700 returns to control block 710 if there are more transactions identified in the correlated events, or proceeds to block 720 (FIG. 7B) if not.

At block 720, the frequency of the identified transactions in the event log is optionally determined. At block 722, after having optionally determined the frequency of the transactions, that information is added to the system workload 106.

At block 724, the performance factors, including both static and dynamic performance factors are retrieved, and at block 726, a performance module is generated for the deployed subject system. Thereafter, the routine terminates.

While various embodiments, including the preferred embodiment, of the invention have been illustrated and described, it will be appreciated that various changes can be made therein without departing from the spirit and scope of the invention.

The embodiments of the invention in which an exclusive property or privilege is claimed are defined as follows:

1. A computing system for determining static performance factors for use in performance modeling of a deployed subject system, the computing system comprising:
   a processor; and
   memory storing the following:
      a plurality of software components comprising the subject system, wherein each of the components is susceptible to event tracing while executing on the computing system;
      a tracing component configured to trace events of the components of the subject system into an event log as the components execute on the computing system, at least some of the events corresponding to discrete actions that comprise a transaction performed by the components;
      a transaction identification table that stores an identifier for one or more transactions that are to be monitored and that stores starting and ending actions for each of the one or more transactions; and
      a transaction identification component configured to:
         access the event to identify the starting and ending actions for each of the one or more transactions listed in the transaction identification table, wherein the event log contains other actions that do not correspond to one of the one or more transactions that are to be monitored;
         identify additional actions other than the starting and ending actions that are part of the one or more transactions; and
         store each of the identified actions of each of the one or more transactions in a transaction workflow data store.

2. The computing system of claim 1, wherein the transaction identification component is further configured to:
   determine the costs of the identified actions corresponding each transaction; and
   store the identified actions and their costs in an action costs data store.

3. The computing system of claim 2, wherein the transaction identification component identifies the additional actions corresponding to the transaction from the traced events according to the starting and ending actions in the transaction identification table by identifying the starting action and the ending action and filtering out any identified actions from the traced events between the starting and ending actions that do not correspond to the transaction.

4. The computing system of claim 1 further comprising a plurality of communicatively coupled computers, and wherein the subject system is distributed upon the plurality of computers.

5. The computing system of claim 4, wherein each of the plurality of computers includes a tracing component, and wherein the tracing component on each of the plurality of computers traces events into an event log on the respective computer.

6. The computing system of claim 1, wherein the transaction identification component is configured to:
   retrieve the plurality of event logs from each of the plurality of computers;
   identify actions, executed by the components of the subject system, from traced events in the plurality of event logs;
   identify related actions corresponding to a transaction according to the starting and ending actions for the transaction; and
   store the actions corresponding to the transaction in the transaction workflow data store.

7. The computer system of claim 4, wherein the plurality of computers comprise computers of at least two types.

8. The computer system of claim 4, wherein each of the plurality of computers includes a tracing component, and wherein the plurality of tracing components provides end-to-end tracing capabilities.

9. The computer system of claim 1, wherein the tracing component is a component of the operating system executing on the computing system.

10. A computer-readable medium bearing computer-executable instructions which, when executed on a computer system, carry out a method for determining static performance factors used in generating a performance model of a subject system deployed on the computer system, the method comprising:
   tracing events of components executing on the computer system, including components of the subject system using a tracing component on the computer system, at least some of the events corresponding to discrete actions that comprise a transaction performed by the components, wherein the events are logged in an event log;
   accessing a transaction identification table that stores an identifier for one or more transactions that are to be monitored and that stores starting and ending actions for each of the one or more transactions;
   accessing the event log to identify the starting and ending actions for each of the one or more transactions listed in the transaction identification table, wherein the event log contains other actions that do not correspond to one of the one or more transactions that are to be monitored;
   identifying additional actions other than the starting and ending actions that are part of the corresponding transaction by identifying any actions between the identified starting and ending actions of the corresponding transaction; and
   storing each of the identified actions for each of the one or more transactions in a transaction workflow data store.

11. The computer-readable medium of claim 10, wherein identifying additional actions that are part of the corresponding transaction further comprises filtering out any actions between the starting and ending actions that do not correspond to the transaction.

12. The computer-readable medium of claim 10 further comprising:
   determining the costs of the identified actions of each of the one or more transactions from information associated with the traced events; and
   storing the identified actions and their determined costs in an action costs data store.

13. The computer-readable medium of claim 10, wherein the computer system comprises a plurality of computers communicatively coupled together upon which the subject system is distributed, and where the method further comprises:
   retrieving an event log from each of the plurality of computers in the computer system, wherein the traced events from each computer are recorded in an event log on the computer;

identifying actions from the traced events from the plurality of event logs;

identifying related actions corresponding to a transaction according to starting and ending actions for the transaction;

storing the related actions corresponding to the transaction in a transaction workflow data store;

determining the costs of the related actions corresponding to the transaction from information associated with the traced events in the plurality of event logs; and storing the identified actions and their determined costs in a action costs data store.

14. The computer-readable medium of claim 13, wherein the plurality of computers in the computer system comprise computers of at least two types.

15. The computer-readable medium of claim 10, wherein the operating system on the computer system includes a component that traces the events of the subject system components.

16. A method for determining performance factors used in generating a performance model of a subject system deployed on a computer system, the method comprising:

obtaining traced events from components executing on the computer system, including components of the subject system using a tracing component on the computer system, at least some of the events corresponding to discrete actions that comprise a transaction performed by the components;

accessing a transaction identification table that stores an identifier for one or more transactions that are to be monitored and that stores starting and ending actions for each of the one or more transactions;

accessing the event to identify the starting and ending actions for each of the one or more transactions listed in the transaction identification table, wherein the event log contains other actions that do not correspond to one of the one or more transactions that are to be monitored;

identify additional actions other than the starting and ending actions that are part of the corresponding transaction by identifying any actions between the identified starting and ending action of the corresponding transaction;

determining the costs of the identified actions of each of the one or more transactions from information associated with the traced events; and storing the identified actions and their determined costs in an action costs data store.

17. The method of claim 16, wherein identifying additional actions that are part of the corresponding transaction comprises:

filtering out any actions in the traced events between the starting and ending actions that do not correspond to the transaction.

18. The method of claim 17, wherein the computer system comprises a plurality of computers communicatively coupled together upon which the subject system is distributed, and where the method further comprises:

retrieving an event log from each of the plurality of computers in the computer system, wherein the event logs include the traced events from the respective computer;

identifying actions from the traced events in the plurality of event logs;

identifying related actions corresponding to a transaction according to starting and ending tokens for the transaction;

storing the related actions corresponding to the transaction in a transaction workflow data store;

determining the costs of the related actions corresponding to the transaction from information associated with the traced events in the plurality of event logs; and storing the identified actions and their determined costs in a action costs data store.

19. The method of claim 18, wherein the plurality of computers in the computer system comprise computers of at least two types.

* * * * *

UNITED STATES PATENT AND TRADEMARK OFFICE
CERTIFICATE OF CORRECTION

| | |
|---|---|
| PATENT NO. | : 7,747,986 B2 |
| APPLICATION NO. | : 11/154090 |
| DATED | : June 29, 2010 |
| INVENTOR(S) | : Glenn F. LaVigne et al. |

It is certified that error appears in the above-identified patent and that said Letters Patent is hereby corrected as shown below:

In column 9, line 33, in Claim 1, after "event" insert -- log --.

In column 11, line 35, in Claim 16, after "event" insert -- log --.

In column 12, line 1, in Claim 16, delete "identify" and insert -- identifying --, therefor.

Signed and Sealed this

Fifteenth Day of February, 2011

David J. Kappos
*Director of the United States Patent and Trademark Office*